(12) United States Patent
Trice et al.

(10) Patent No.: US 10,634,362 B2
(45) Date of Patent: Apr. 28, 2020

(54) OVEN BOTTOM WITH COOKING SURFACE

(71) Applicant: Midea Group Co., Ltd., Beijiao (CN)

(72) Inventors: Daniel J. Trice, Louisville, KY (US); Vern Neal, Louisville, KY (US)

(73) Assignee: MIDEA GROUP CO., LTD., Beijiao, Shunde, Foshan, Guangdong (CN)

( * ) Notice: Subject to any disclaimer, the term of this patent is extended or adjusted under 35 U.S.C. 154(b) by 743 days.

(21) Appl. No.: 15/198,835

(22) Filed: Jun. 30, 2016

(65) Prior Publication Data

US 2018/0003390 A1     Jan. 4, 2018

(51) Int. Cl.
| | |
|---|---|
| F24C 7/06 | (2006.01) |
| F24C 15/08 | (2006.01) |
| A21B 1/50 | (2006.01) |
| A21B 3/15 | (2006.01) |
| F24C 15/16 | (2006.01) |
| F24C 15/04 | (2006.01) |

(52) U.S. Cl.
CPC ............... *F24C 7/062* (2013.01); *A21B 1/50* (2013.01); *A21B 3/15* (2013.01); *F24C 15/04* (2013.01); *F24C 15/08* (2013.01); *F24C 15/16* (2013.01)

(58) Field of Classification Search
CPC ........ F24C 15/235; F24C 15/04; F24C 15/08; F24C 15/16; F24C 7/062; A21B 1/50; A21B 3/15
See application file for complete search history.

(56) References Cited

U.S. PATENT DOCUMENTS

| | | | |
|---|---|---|---|
| 4,476,848 A * | 10/1984 | Protas | A21B 1/52 126/19 M |
| 5,413,033 A | 5/1995 | Riccio | |
| 5,496,987 A | 3/1996 | Siccardi et al. | |
| 5,605,092 A | 2/1997 | Riccio | |
| 6,199,549 B1 | 3/2001 | Yerkes | |
| 6,425,388 B1 | 7/2002 | Korinchock | |
| 6,831,255 B1 * | 12/2004 | Levi | F24C 7/06 126/21 A |
| 7,323,663 B2 | 1/2008 | Cavada et al. | |
| 7,686,010 B2 | 3/2010 | Gustavsen | |
| 8,063,342 B2 | 11/2011 | Hines, Jr. | |

(Continued)

FOREIGN PATENT DOCUMENTS

| | | |
|---|---|---|
| CN | 1358476 A | 7/2002 |
| CN | 102478262 A | 5/2012 |

(Continued)

OTHER PUBLICATIONS

Introducing the New BlueStar® Electric Wall Oven; URL: http://www.prnewswire.com/news-releases/introducing-the-new-bluestar-electric-wall-oven-251252221.html; dated Mar. 20, 2014.

(Continued)

*Primary Examiner* — Shawntina T Fuqua
(74) *Attorney, Agent, or Firm* — Middleton Reutlinger

(57) ABSTRACT

A cooking appliance includes a cooking compartment with an oven bottom. The oven bottom includes a cooking surface. A cooking member may include the cooking surface. The cooking member may extend from the cooking compartment to the heating compartment. A bottom cover of the oven bottom may include a carrier and the cooking member. The oven bottom with cooking surface may be used in a variety of applications.

24 Claims, 9 Drawing Sheets

(56) References Cited

U.S. PATENT DOCUMENTS

| | | | |
|---|---|---|---|
| 9,016,191 B2 | 4/2015 | Krolick et al. | |
| 9,182,129 B2 | 11/2015 | Dahle et al. | |
| 9,347,673 B1* | 5/2016 | Smart | F24C 15/007 |
| 2002/0074323 A1* | 6/2002 | De' Longhi | F24C 15/325 |
| | | | 219/400 |
| 2008/0128404 A1 | 6/2008 | Froelicher | |
| 2012/0067334 A1* | 3/2012 | Kim | F24C 15/166 |
| | | | 126/39 R |
| 2012/0321770 A1 | 12/2012 | Pelle | |
| 2014/0026881 A1 | 1/2014 | Abrams et al. | |
| 2015/0047512 A1 | 2/2015 | Marra | |

FOREIGN PATENT DOCUMENTS

| | | |
|---|---|---|
| CN | 203634029 U | 6/2014 |
| CN | 204483896 U | 7/2015 |
| CN | 105167642 A | 12/2015 |
| EP | 1764560 | 3/2007 |
| EP | 2399459 | 12/2011 |
| EP | 2510790 | 10/2012 |
| FR | 2380682 | 9/1978 |
| WO | 2012131333 | 10/2012 |

OTHER PUBLICATIONS

BLUESTAR_Unleash Your Inner Chef; Use & Care Manual; PA; dated 2015.

International Search Report and Written Opinion issued in Application No. PCT/CN2017/087802 dated Sep. 4, 2017.

* cited by examiner

OVEN BOTTOM WITH COOKING SURFACE

BACKGROUND

The present embodiments relate to a cooking surface integrated into an oven bottom for a cooking appliance, and particularly, but not limited to, an oven bottom cover for a gas and/or electric appliance.

As shown in FIG. 1, a typical oven bottom 1 of the cooking compartment may form the lowest portion of the oven's cooking compartment. The oven bottom may catch spills from items cooked upon the racks. The bottom typically provides an outlet 2 for heat and/or combustion products to be directed out of the heating compartment and subsequently exit out of the cooking compartment. The oven bottom may reduce the likelihood that the consumer comes into contact with open flames and electrical components, such as the gas ignition. Portions of the oven bottom can be removable without hand tools if the igniter is shielded to reduce contact by the user. The oven bottom is typically stamped steel that is then porcelain coated due to the high temperatures (800-1000 degrees Fahrenheit) expected in the oven. Normally there is a stamped metal flame spreader 3 directly beneath the oven bottom between the burner to direct flames from a burner 4 and reduce direct impingement of the flame onto the underside of the oven bottom.

Typical metal cooking compartments of cooking appliances would allow a user to merely place a cooking stone onto one of the metal rack's spaced above the metal oven bottom. Heat from a burner would then need to propagate thru a metal flame spreader, enameled steel oven bottom, and then the air gap from the metal oven bottom to the rack before heating the cooking stone.

There are several disadvantages associated with the cooking stone spaced from the metal oven bottom. The cooking stone may be difficult to preheat to a specific temperature desired by the user. There is also additional handling and storing of the cooking stone separate from the rack. Further, typically oven bottoms are not utilized as a cooking surface or area and therefore cooking volume is lost. Also the flame spreader is typically needed to reduce the potential for porcelain "crazing" and "de-glossing".

Thus there is a need to integrate a cooking surface into the oven bottom.

SUMMARY

In some embodiments, a kitchen oven includes a cooking compartment above a heating compartment, wherein the cooking compartment includes a bottom, two sides, a back, a top, and a front door allowing frontal access into the cooking compartment. At least one heat source positioned within the heating compartment. The bottom of the cooking compartment has a bottom cover. The bottom cover defines an opening between the cooking compartment and the heating compartment. At least a portion of the bottom cover has a cooking surface. The front door allows frontal access into the cooking compartment to position the bottom cover between a closed position and an open position. At least one heat source is accessible through the opening between the cooking compartment and the heating compartment when in the open position. The cooking surface allows direct contact of an item to be baked when the bottom cover is in the closed position.

In addition, in some embodiments, the cooking surface includes a planar surface, wherein the planar surface of the cooking surface is positioned above a remaining portion of the bottom cover. The cooking surface includes a planar surface, wherein the planar surface of the cooking surface is positioned below a remaining portion of the bottom cover. The at least one heat source within the heating compartment is combustion. The at least a portion of the bottom cover having the cooking surface is made of a material of at least one of clay, stone, ceramic, cast iron, and steel. The cooking surface is made of the material of at least one of clay, stone, and ceramic. The at least a portion of the cooking surface is unglazed. The bottom cover includes a carrier and a cooking member, wherein the cooking member includes the cooking surface. The carrier of the bottom cover is a material different from the cooking member. The carrier includes one or more vent openings in fluid communication with the cooking compartment and the heating compartment. An outer periphery of the cooking member is engaged by an inner periphery of the carrier. The bottom cover includes one or more vent openings in fluid communication with the cooking compartment and the heating compartment.

In some embodiments, a kitchen oven may include a cooking compartment including a top, a bottom, at least two sides, and a front door, wherein the front door defines a first opening allowing access into the cooking compartment. The kitchen oven has a heating compartment below the cooking compartment. The bottom defines at least a portion of the heating compartment. At least one heat source positioned below the bottom within the heating compartment. The bottom includes a bottom cover defining an opening between the cooking compartment and the heating compartment allowing access into the heating compartment through the cooking compartment. At least a portion of the bottom cover is a cooking member, wherein the cooking member includes a cooking surface.

In addition, in some embodiments, the cooking surface is recessed relative to an adjacent portion of the bottom cover. The cooking surface upwardly protrudes from an adjacent portion of the bottom cover. The at least one heat source within the heating compartment is combustion. The cooking member is made of at least one of clay, stone, ceramic, cast iron, and steel. The cooking member is made of at least one of clay, stone, and ceramic. At least a portion of the cooking surface is unglazed. The bottom cover includes a carrier, wherein the carrier and the cooking member define the second opening. The carrier of the bottom cover is of a material different from the cooking member. The bottom cover includes one or more vent openings in fluid communication with the cooking compartment and the heating compartment. The cooking member within the bottom cover extends from the cooking compartment to the heating compartment.

Further, in some embodiments a general purpose kitchen oven appliance includes a cooking compartment having a substantially planar oven bottom, two oven sides, an oven back, a substantially planar oven top, and a front door hingedly connected for opening to allow frontal access to the cooking compartment. A heat source positioned beneath the oven bottom, wherein the oven bottom further comprises a cooking surface integrally formed in the oven bottom for directly contacting an item to be baked in the cooking compartment. The cooking surface is made of one or more materials, wherein the one or more materials is at least one of clay, stone, ceramic, cast iron, and steel.

In addition, in some embodiments, the cooking surface is substantially planar with, raised, or depressed within the oven bottom. The oven bottom is stamped metal about the cooking surface. The one or more materials is at least one of clay, stone, and ceramic. A portion of the cooking surface may be unglazed.

These and other advantages and features, which characterize the embodiments, are set forth in the claims annexed hereto and forming a further part hereof. However, for a better understanding of the embodiments, and of the advantages and objectives attained through its use, reference should be made to the Drawings, and to the accompanying descriptive matter, in which there is described example embodiments. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
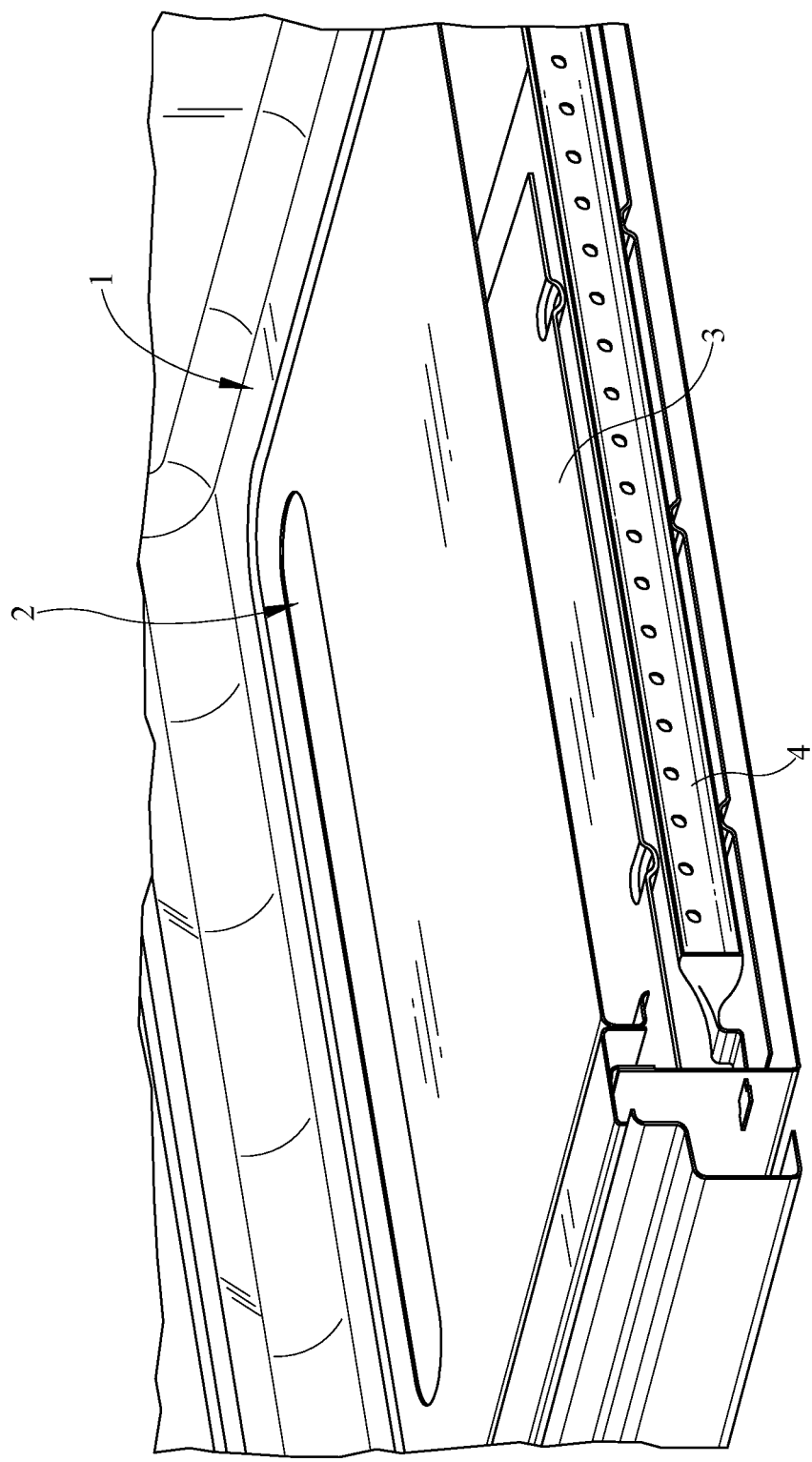
FIG. 1 is a perspective cross sectional view of an oven bottom of the prior art.
Figure 2:
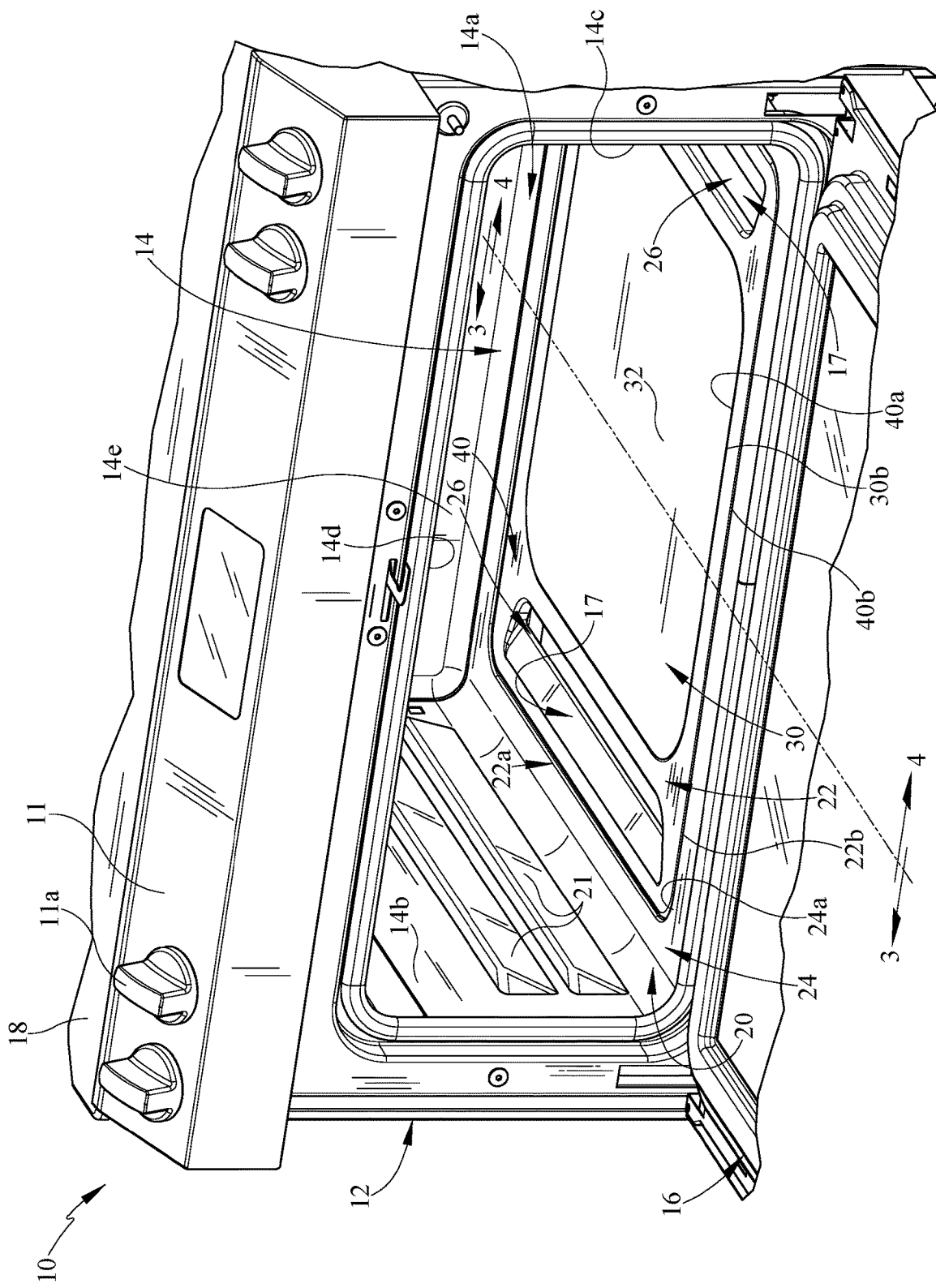
FIG. 2 is a perspective view of one embodiment of the cooking compartment with the oven bottom with a cooking surface, the oven front door is illustrated in the open position and portions of the cooking appliance broken away.

As shown in the Figures, a home oven or cooking appliance 10, such as but not limited to a slide-in cooking range, has a housing 12 and a cooking compartment 14, such as a baking oven, convection oven, steam oven, warming drawer and the like, in the housing 12 and accessible through a front door or drawer 16 in the front of the housing 12. One application of an embodiment of the cooking appliance may be for a general purpose kitchen oven. The front door 16 may define an opening 14a into the cooking compartment 14 and be positionable between an open position (FIG. 2) and a closed position (FIG. 4) relative to the remainder of one or more of the walls or sides of the cooking compartment 14. The cooking appliance 10 may, for example, be a gas range.

The cooking appliance 10 may include a cooktop surface 18 on a top of the housing 12. The cooking appliance 10 may further include a control panel 11 having a plurality of control knobs or controls 11a for controlling the gas burners, if a range used, and/or cooking compartment 14. The cooking compartment 14 may be defined by a variety of walls or surfaces including, but not limited to, a bottom 20, two sides 14b and 14c, a top 14d, a back 14e, and a front door 16 allowing frontal access into the cooking compartment 14. In the embodiment shown, the front door 16 is hingedly connected, by one or more hinges, for opening to allow frontal access into the cooking compartment 14 through opening 14a. One or more of the bottom 20, sides 14b and 14c, top 14d, back 14e, and front door 16 may be substantially planar. Further, one or more of the inside walls defining the boundaries of the cooking compartment 14 may be substantially perpendicular to each other. A heating compartment 17 (FIGS. 3 and 4) is positioned adjacent to the cooking compartment 14. As is illustrated in one embodiment, the heating compartment 17 is positioned below the cooking compartment 14. One or more heat sources 19 may be positioned in the heating compartment 17. The heat source 19 is positioned below the bottom 20 within the heating compartment 17. Although one or more gas burners within the heating compartment is shown in the figures, it should be understood that the heat source may be electric, hybrid of gas and electric, or combination of heat sources thereof.

Figure 3:
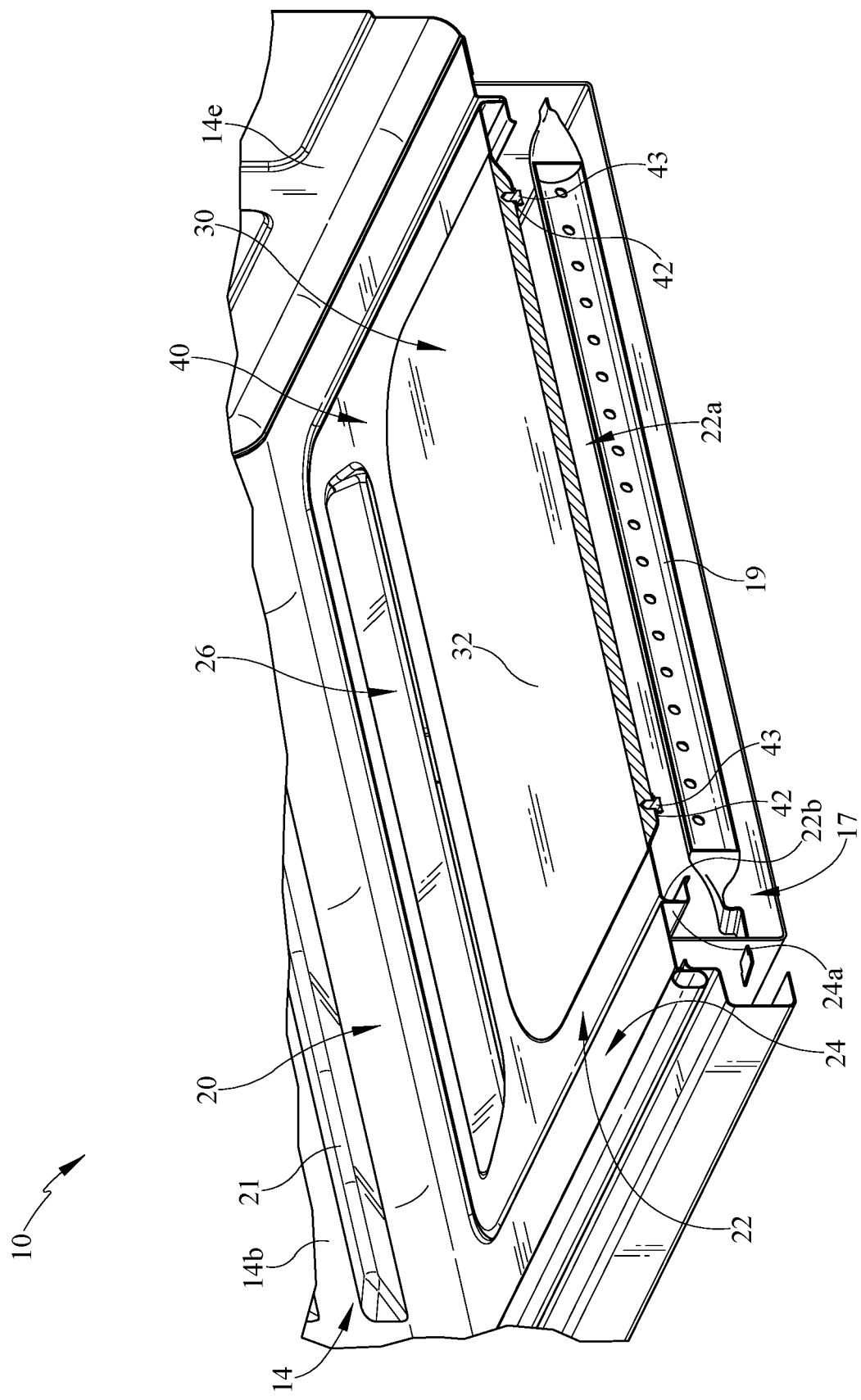
FIG. 3 is a perspective cross sectional view of the embodiment of FIG. 2 taken along line 3-3.
Figure 4:
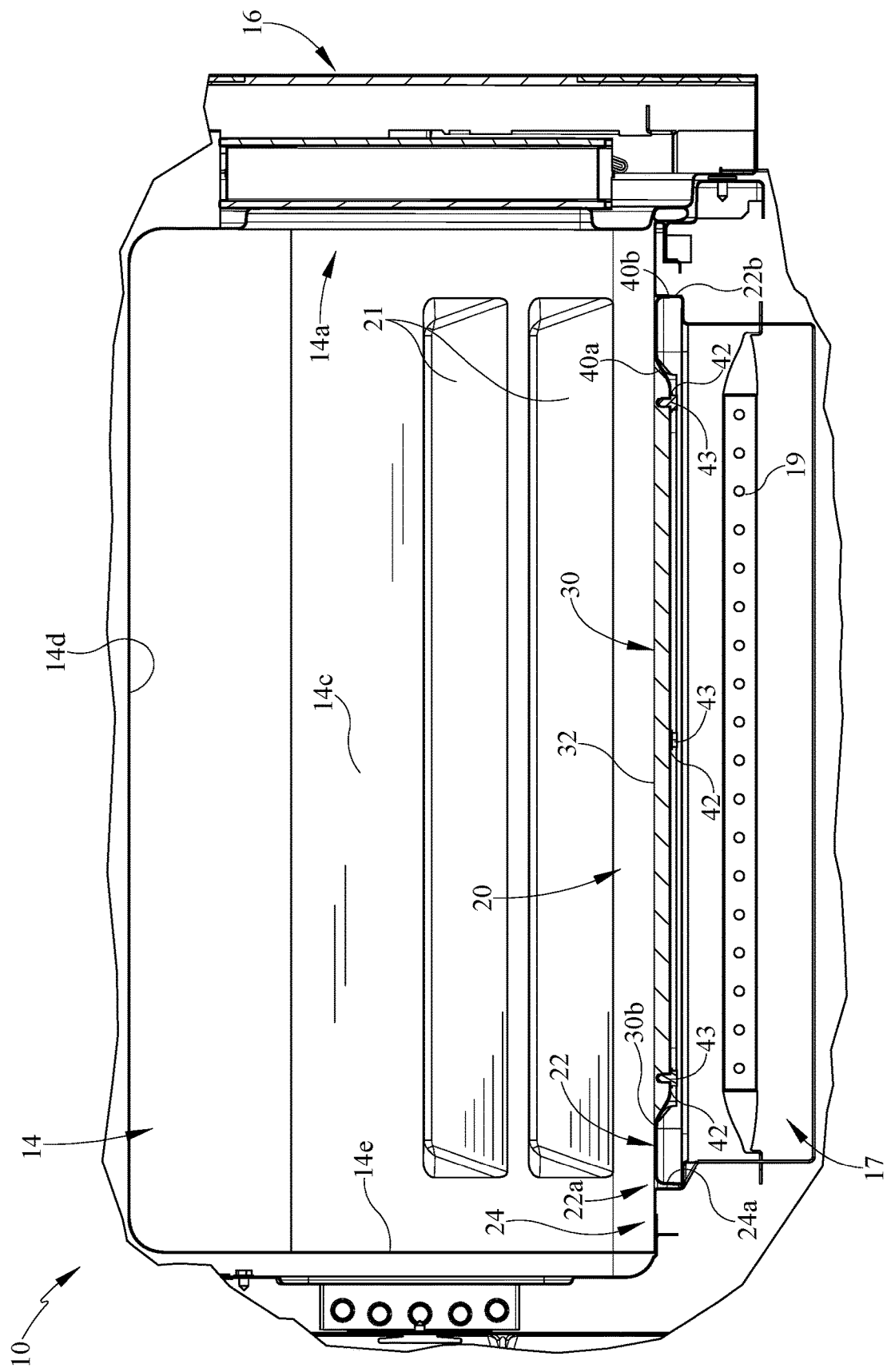
FIG. 4 is a cross sectional view of the embodiment of FIG. 2 taken along line 4-4.
Figure 5:
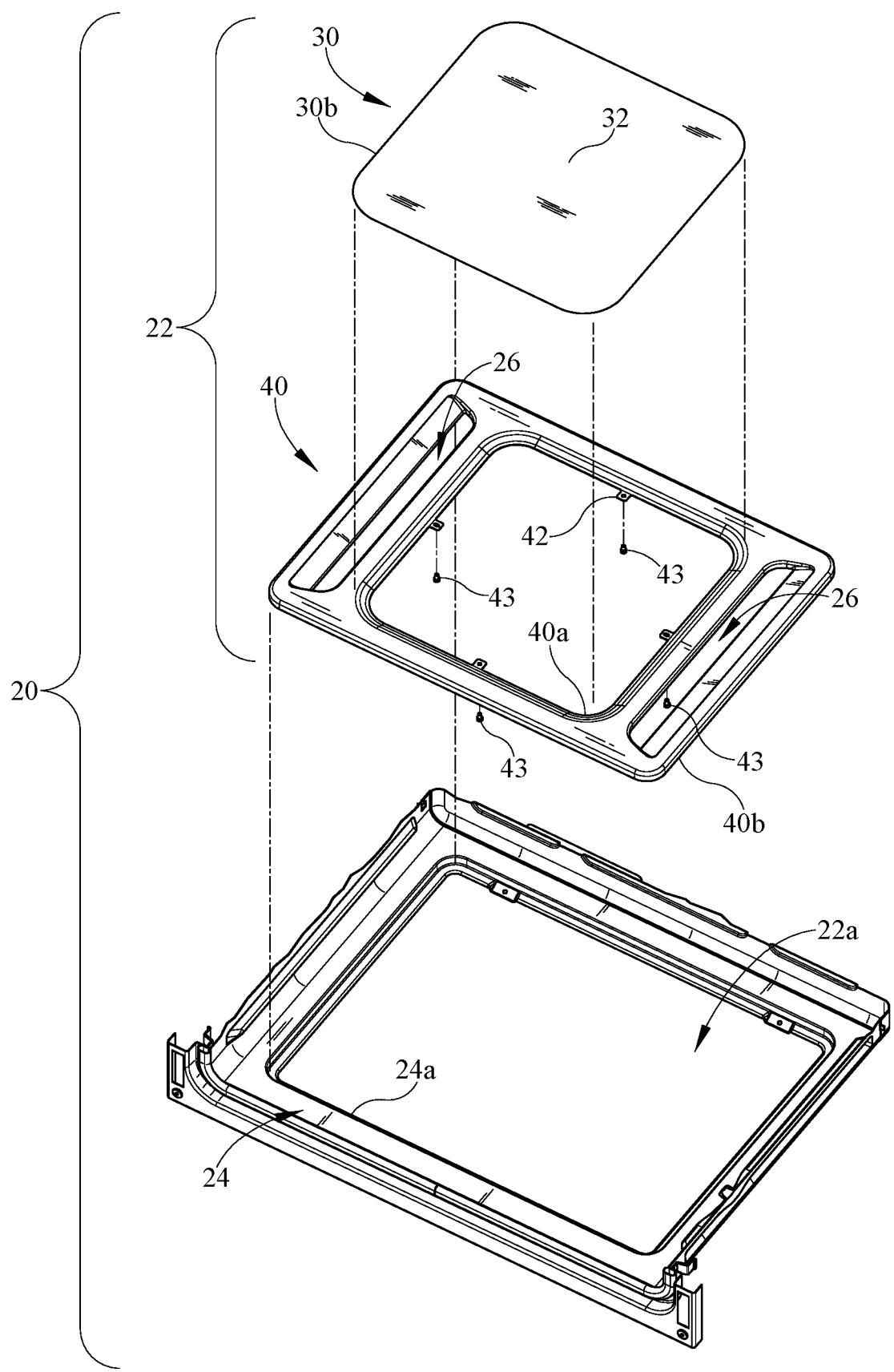
FIG. 5 is an exploded view of the oven bottom of FIG. 2 with portions of the cooking compartment and heating compartment removed.

As is illustrated in the Figures, at least a portion of the bottom 20 includes a cooking member 30 integrated therein. The cooking member 30 includes a cooking or baking surface 32. The cooking surface 32 faces upwardly and inwardly into the cooking compartment 14, away from the heating compartment 17. The cooking surface 32 directly contacts the item (not shown), such as food, to be baked. The cooking surface 32 may encompass the surface area of the bottom 20 and/or cooking member 30, or portions thereof. The cooking member 30 and/or cooking surface 32 may be made of, but is not limited to, one or more materials that may include cast iron, steel, stone, ceramic, and clay. For example, an embodiment using steel may be about a quarter inch to about one inch thick, preferably ¼" or ½" thick. Another example of an embodiment of the cooking member 30 may be a pizza stone application. The cooking member 30 and/or cooking surface 32 is disposed over and above the heating compartment 17, or more specifically the heat source 19. The cooking member 30 may extend from the cooking compartment 14 to the heating compartment 17. The heat from the heat source 19 may have an unobstructed path to the cooking member 30 as is shown in FIGS. 3 and 4, without obstruction from other structures, such as a flame spreader, within the heating compartment 17. The cooking member 30 may, for example, be in direct contact or connection with the oven flame. The cooking member 30 may reduce "crazing" and/or "de-glossing" unlike typically stamped metal.

It is understood that the cooking surface and/or cooking member may be a variety of sizes, shapes, construction, and quantities and still be within the scope of the teachings herein. For example, the cooking surface 32 does not have to be the same size or shape as the cooking member 30.

At least a portion of the cooking compartment 14 integrates the bottom 20 with the cooking member 30. As is shown in one embodiment, the bottom 20 may include one or more bottom covers 22. If used, the bottom cover 22 may include the cooking member 30 with cooking surface 32. The bottom 20 and/or bottom cover 22 may define a portion of the heating compartment 17 and the cooking compartment 14. A portion of the bottom 20 may define one or more openings 22a between the heating compartment 17 and the cooking compartment 14. The one or more openings 22a allow access into the heating compartment 17. The heat source 19 or other components may be accessible through the opening 22a. The bottom cover 22 may engage a portion of the bottom 20, such as but not limited to the remaining portion 24, and/or one or more walls of the cooking compartment 14. As is shown in the embodiment, the inner periphery 24a of the remaining portion 24 of the bottom 20 surrounds and may engage at least partially the outer periphery 22b of the bottom cover 22. The cooking member 30 may extend from the cooking compartment to the heating compartment. The bottom cover 22 engages the bottom 20 between a closed position (FIGS. 2-4) and an open position. When the bottom cover 22 is in the closed position, the bottom cover 22 may close at least a portion of the opening 22a and the heat source 19 may heat the cooking member 30 and/or the cooking surface 32 as desired by a user. When the bottom cover 22 is in the open position, one more components within the heating compartment 17, such as but not limited to the heat source 19, may be accessible through the opening 22a. In use, the front door 16 may allow access into the cooking compartment and manipulation of the bottom cover 22 between one or more positions relative to the cooking compartment 14 and/or opening 22a to provide access through the opening 22a into the heating compartment 17.

It should be understood that a variety of engagements between the bottom cover 22 and the remaining portion 24 of the bottom 20, if used, may be used and still be within the scope of the teachings herein. For example, a friction fit, gravity placement, tongue-and-groove, overlapping lips, channels, and/or one or more fasteners may be used to secure, fixedly or releasably, the bottom cover 22 over the opening 22a. Further, the attachments or fasteners (not shown) may be removable by a tool and/or may be released without a tool, such as by hand.

Figure 6:
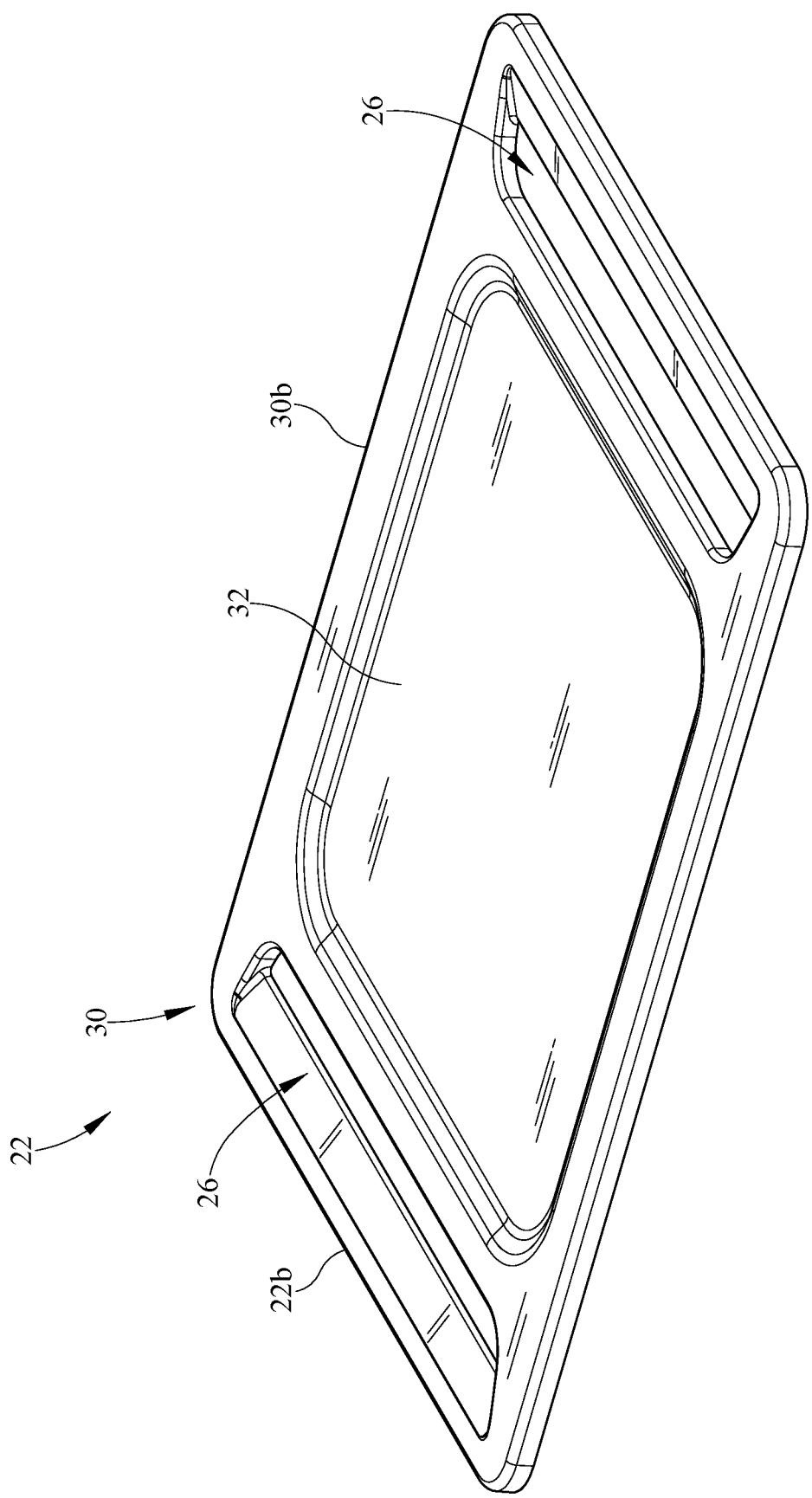
FIG. 6 is a perspective view of one embodiment of the oven bottom cover having a lower or sunken cooking surface.
Figure 7:
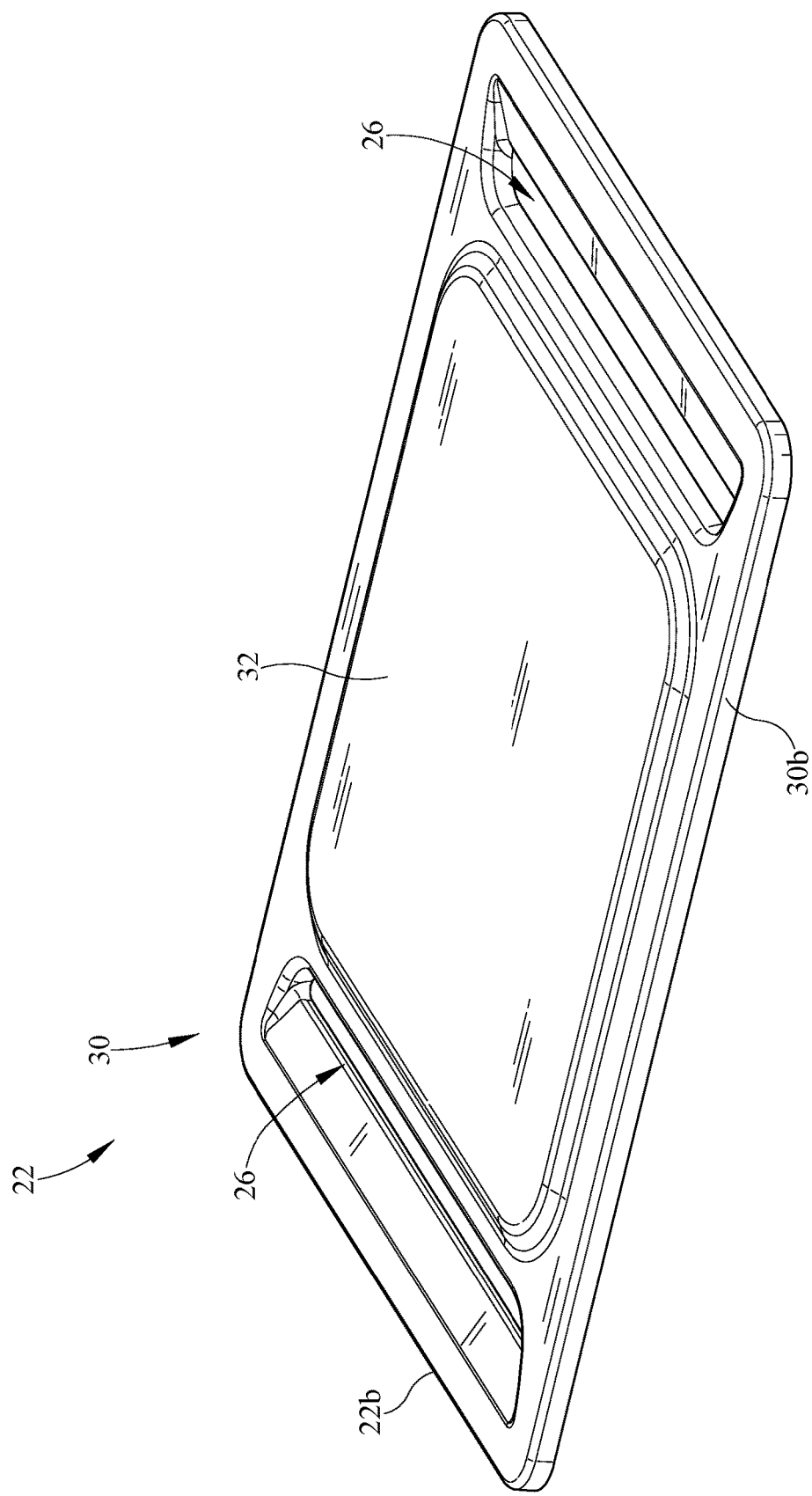
FIG. 7 is a perspective view of one embodiment of the oven bottom cover having a higher or raised cooking surface.
Figure 8:
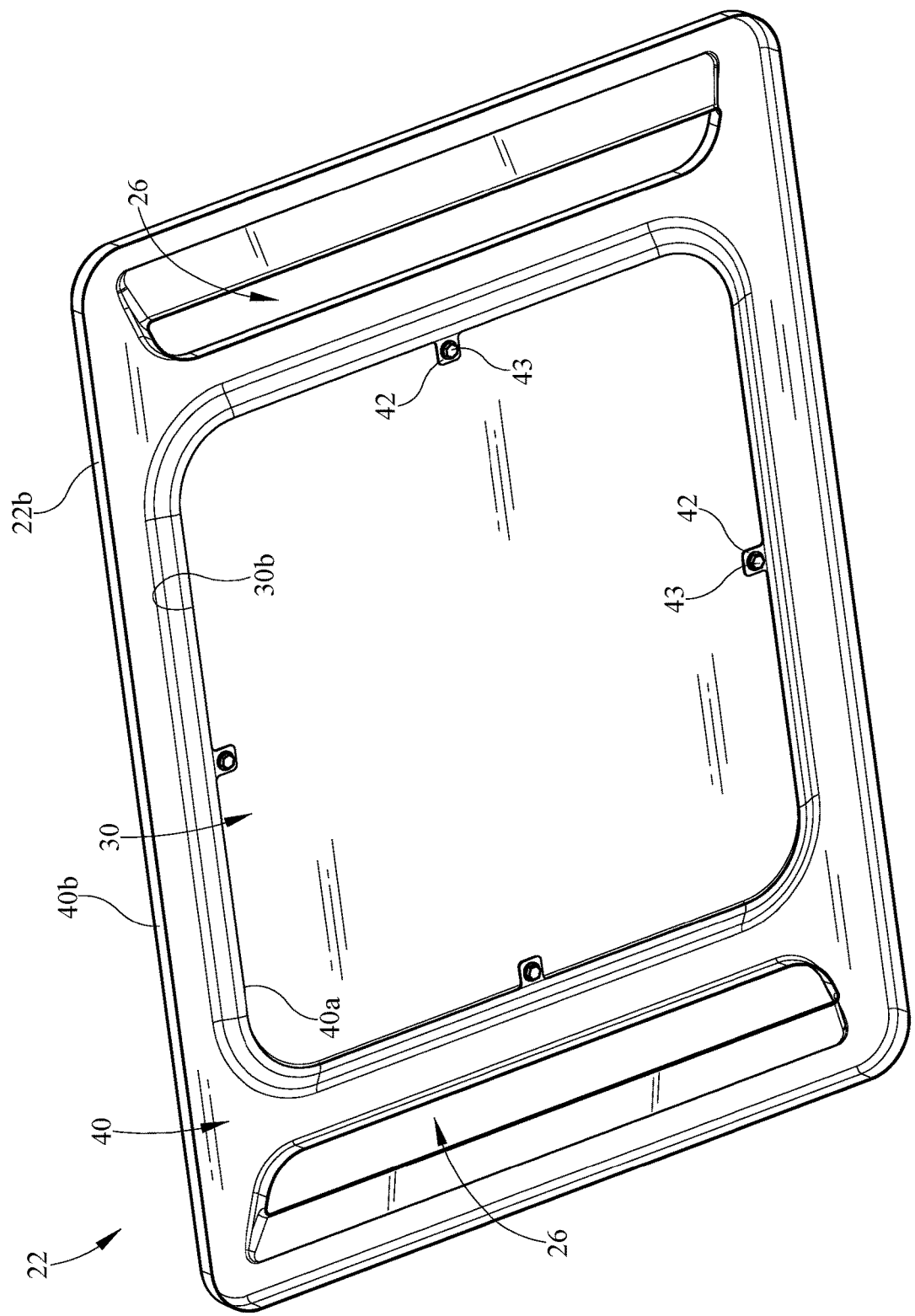
FIG. 8 is bottom view of the oven bottom cover embodiment of FIG. 2 illustrating one engagement embodiment between the cooking member having the cooking surface and the carrier.
Figure 9:
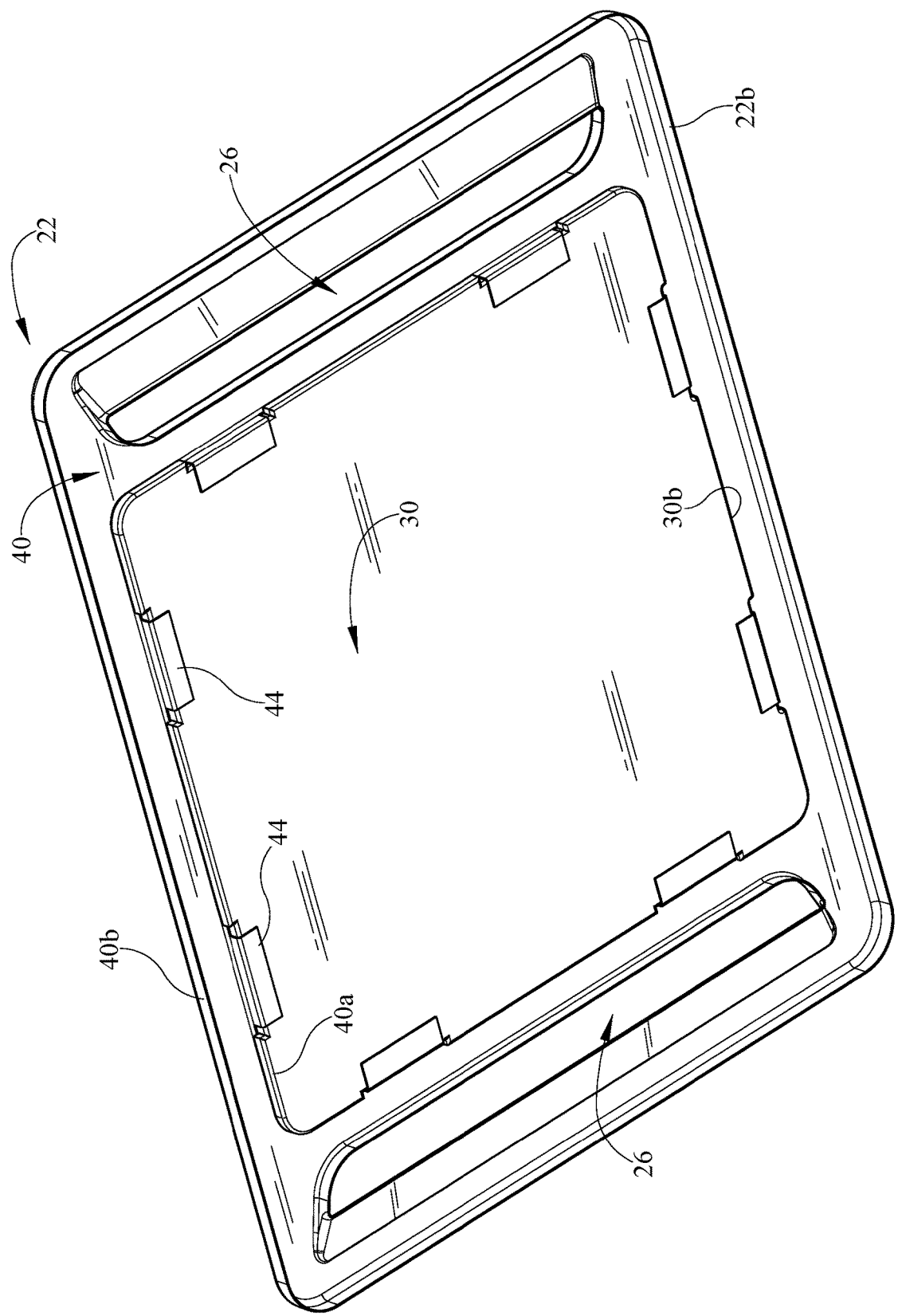
FIG. 9 is bottom view of an embodiment of the oven bottom cover illustrating another embodiment of the engagement between the cooking member having the cooking surface and a carrier.

The bottom cover 22 may include at least a portion of the cooking member 30 and/or cooking surface 32. As is shown in FIGS. 6 and 7, the cooking member 30 is substantially the entire bottom cover 22 with at least a portion, or more specifically the central or top surface area for one embodiment, for the cooking surface 32. Alternatively, the cooking member 30 may encompass one or more portions of the bottom cover 22. (See FIGS. 2-5, 8, and 9). The bottom cover 22 may be a first material different from a second material of the remaining portion 24 of the bottom 20 and/or bottom cover 22. The second material may be, but is not limited to, enameled steel. One or more of the bottom 20, bottom cover 22, and the cooking member 30 may include one or more vent openings 26 therein. The one or more vent openings 26 are in fluid communication with the heating compartment 17 and the cooking compartment 14. In the embodiment of FIGS. 2-5, 8, and 9, the vent openings 26 are positioned within the bottom cover 22 but not within the cooking member 30. Alternatively, one or more vent openings 26 may be positioned within the cooking member 30 within the bottom cover 22 when used without a carrier as in FIGS. 6 and 7 or with a carrier (not shown).

The cooking member 30, in some embodiments, may not comprise the entire bottom cover 22 and/or bottom 20. As is shown in FIGS. 2-5, 8, and 9, the bottom cover 22 may include a carrier 40 and the cooking member 30. Alternatively in some embodiments as shown in FIGS. 6 and 7, the cooking member 30 is the entire bottom cover 22 without a carrier 40. As shown in FIGS. 2-5, 8, and 9, the carrier 40 engages the cooking member 30. The outer periphery 40b of the carrier 40 may releasably engage the remaining portion 24 of the bottom 20 and the inner periphery 40a of the carrier 40 may engage the outer periphery 30b of the cooking member 30. The cooking member 30 with cooking surface 32 may be a first material as described above, wherein the first material may be different from one or more of the carrier 40, remaining portion 24, and/or bottom 20. The second material of the carrier 40 may be, but is not limited to, a stamped metal. Carrier 40 may be the same material as the remaining portion 24, if used. The carrier 40 may, releasably or nonreleasably, engage the cooking member 30. As is shown in the embodiment of FIGS. 2-5, 8, and 9, the carrier 40 may include the one or more vent openings 26. The carrier 40 may engage with the cooking member 30 in a variety of ways, such as receiving the cooking member 30 from the top or bottom of the carrier 40 and secured by one or more fasteners. In the embodiment shown in FIGS. 2-5 and 8, the cooking member has threaded openings secured to a plurality of tabs or brackets 42 by fasteners 43 such as screws. Further, the opposing surface of the cooking member 30 may overlap a lip or inner periphery 40a of the carrier 40. In the embodiment shown in FIG. 9, the cooking member 30 is positioned by opposing surfaces of the carrier 40, a top pocket or circumferential lip (not shown) adjacent the carrier top and one or more opposing tabs or brackets 44 at the carrier bottom may define the inner periphery 40a of the carrier 40. The opposing carrier structure may fix the relative position of the cooking member 30 relative to the carrier 40. It should be understood that a variety of engagements between the cooking member 30 and carrier 40 may be used and still be within the scope of the teachings herein. Cooking member 30 may be removable from the carrier 40, if used, for cleaning purposes, replacement, and/or exchanging out the cooking surface or cooking member for another type of material as desired by the user. Alternatively, the cooking member 40 may be removed for temporary application of the cooking appliance 10 without a cooking member. Similarly, if a carrier is used, a variety of engagements between the bottom 20 or other wall portions and the carrier may be used.

Although the cooking member 30 and cooking surface 32 is shown in detail in the drawings, it is merely representative of some embodiments, and it is to be understood that there are a variety of shapes, sizes, orientations, constructions, and quantities which may be used and still be within the scope of the teachings herein. For instance, the cooking surface 32 may substantially encompass the entirety of the top surface of the cooking member 30 or portions thereof. Further, the cooking member 30 and/or cooking surface 32 may include one or more areas that are glazed and/or unglazed. Because users might desire portions of the cooking member 30 to have different cooking properties, portions of the cooking member 30 may be coated with glaze to reduce crispness. Further, unglazed cooking surfaces may increase the cooking member's ability to drain moisture out of the food item that is being cooked upon the cooking surface. The cooking members or coatings thereon may include a variety of colors to indicate glazed, unglazed, and/or differentiate between cooking surfaces and non-cooking surfaces of the cooking member. Grooves or ribs that contain spills may also be used in one or more surfaces, such as the cooking surface, of the cooking member or created when combined with other structure of the bottom.

As illustrated in the embodiments of the Figures, the cooking surface 32 of the cooking member 30 may be substantially planar. Portions of or substantially all of the cooking surface 32 may be offset, above or below, or level with surrounding portions of the cooking member 30 with or without a carrier, carrier 40, and/or bottom 20 of the cooking compartment 14. As shown in the embodiment of FIGS. 2-5, the cooking surface 32 is substantially flush with the carrier 40. As shown in the embodiment of FIG. 7 with no carrier, the planar surface of the cooking surface 32 upwardly protrudes from adjacent portions of the cooking member 30 of the bottom cover 22, as such a raised cooking surface 32 may be more accessible and identifiable by the user. As shown in the embodiment of FIG. 6 with no carrier, the cooking surface 32 is sunken, depressed, or lower than the remaining portion of the cooking member 30 of the bottom cover 22. The planar surface of the cooking surface 32 is recessed relative to the adjacent portions of the cooking member 30. A well or groove may be formed to capture spills in the oven, when for example the cooking surface 32 is lower than the one or more portions of the cooking member or carrier. Alternatively, grooves or ribs to facilitate grilling may be formed or positioned within cooking member 30, adjacent the cooking surface 32, between the cooking member 30 and the carrier 40.

The integrated oven bottom 20 with cooking surface 32 may be used in a variety of applications. Although the embodiments shown are for gas or combustion, it is understood that electric may be used alone or in combination with the gas. Also for example, additional heat sources may heat the cooking compartment 14 from behind or with convection. Further, the cooking appliance 10 may be used with or without stove top burners, for instance electric and/or gas. For example, the embodiments of the invention may be used in, but is not limited to, a built-in, a free standing, slide in, or dual oven such as the upper oven. Although not shown in detail, the cooking appliance 10 may have one or more cooking features or user modes associated with the oven bottom 20 having the cooking surface 32 such as, but is not limited to, a slow cook and/or pizza mode for the user based on algorithms and desired cooking characteristics. Further, an alternative embodiment of the cooking member may be a removable cooking member that can be received by the oven bottom of an electric range when desired by the user. Further when electric heat sources are available, electric heating elements may be attached directly to the cooking member. In addition, although racks are not shown in FIGS. 2-4, it should be understood that one or more metal or baking racks may be used with one or more rails 21 of the sides 14b and 14c.

Although the oven bottom 20, bottom cover 22, cooking member 30, carrier 40, and/or cooking surface 32 is shown in detail in the drawings, it is merely representative of one embodiment, and it is to be understood that there are a variety of shapes, sizes, orientations, constructions, and quantities which may be used and still be within the scope of the teachings herein.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It is to be understood that the embodiments are not limited in its application to the details of construction and the arrangement of components set forth in the description or illustrated in the drawings. The invention is capable of other embodiments and of being practiced or of being carried out in various ways. Unless limited otherwise, the terms "connected," "coupled," "in communication with," and "mounted," and variations thereof herein are used broadly and encompass direct and indirect connections, couplings, and mountings. In addition, the terms "connected" and "coupled" and variations thereof are not restricted to physical or mechanical connections or couplings.

The foregoing description of several embodiments of the invention has been presented for purposes of illustration. It is not intended to be exhaustive or to limit the invention to the precise steps and/or forms disclosed, and obviously many modifications and variations are possible in light of the above teaching.

The invention claimed is:

1. A kitchen oven comprising:
    a cooking compartment above a heating compartment, wherein said cooking compartment includes a bottom, two sides, a back, a top, and a front door allowing frontal access into said cooking compartment;
    at least one heat source positioned within said heating compartment;
    said bottom of said cooking compartment having a bottom cover received within an inner periphery of a remaining portion thereof;
    said bottom cover defining an opening through said inner periphery of said remaining portion of said bottom between said cooking compartment and said heating compartment, wherein said bottom cover includes a carrier and a cooking member, wherein said carrier includes an outer periphery engaged with said inner periphery of said remaining portion of said bottom and an inner periphery, and wherein said cooking member includes an outer periphery engaged with said inner periphery of said carrier;
    one or more fasteners coupling said cooking member to said carrier
    wherein said cooking member includes a cooking surface, wherein said cooking surface is made of one or more first materials, wherein said one or more first materials is at least one of clay, stone, cast iron, and steel, and said carrier is made of a second material different from said one or more first materials; and
    said front door allows frontal access into said cooking compartment to position said bottom cover between a closed position and an open position, wherein said at least one heat source is accessible through said opening between said cooking compartment and said heating compartment when in said open position, and wherein said cooking surface allows direct contact of an item to be baked when said bottom cover is in said closed position.

2. The kitchen oven of claim 1 wherein said cooking surface includes a planar surface, wherein said planar surface of said cooking surface is positioned above said carrier of said bottom cover.

3. The kitchen oven of claim 1 wherein said cooking surface includes a planar surface, wherein said planar surface of said cooking surface is positioned below said carrier of said bottom cover.

4. The kitchen oven of claim 1 wherein said at least one heat source within said heating compartment is combustion.

5. The kitchen oven of claim 1 wherein said bottom cover having said cooking surface is made of said one or more first materials of at least one of clay, stone, and cast iron.

6. The kitchen oven of claim 5 wherein said cooking surface is made of said one or more first materials of at least one of clay and stone.

7. The kitchen oven of claim 6 wherein said cooking surface is unglazed.

8. The kitchen oven of claim 1 wherein said carrier includes one or more vent openings in fluid communication with said cooking compartment and said heating compartment.

9. The kitchen oven of claim 1 wherein said bottom cover includes one or more vent openings in fluid communication with said cooking compartment and said heating compartment.

10. A kitchen oven comprising:
    a cooking compartment including a top, a bottom, at least two sides, and a front door, wherein said front door defines a first opening allowing access into said cooking compartment;
    a heating compartment below said cooking compartment, wherein said bottom defines at least a portion of said heating compartment;
    at least one heat source positioned below said bottom within said heating compartment;
    said bottom includes a bottom cover defined by a remaining portion of said bottom, said bottom cover defining an opening through said remaining portion between said cooking compartment and said heating compartment allowing access into said heating compartment through said cooking compartment;
    wherein said bottom cover includes a carrier receiving a cooking member, wherein said cooking member includes a cooking surface, wherein said cooking member is made of a first material of at least one of clay, stone, cast iron, and steel; and
    wherein said carrier of said bottom cover is of a second material different from said first material of said cooking member.

11. The kitchen oven of claim 10 wherein said cooking surface of said cooking member is recessed relative to said carrier of said bottom cover.

12. The kitchen oven of claim 10 wherein said cooking surface of said cooking member upwardly protrudes from said carrier of said bottom cover.

13. The kitchen oven of claim 10 wherein said at least one heat source within said heating compartment is combustion.

14. The kitchen oven of claim 10 wherein said cooking member is made of at least one of clay, stone, and cast iron.

15. The kitchen oven of claim 14 wherein said cooking member is made of at least one of clay and stone.

16. The kitchen oven of claim 15 wherein at least a portion of said cooking surface is unglazed.

17. The kitchen oven of claim 10 wherein said carrier includes one or more vent openings in fluid communication with said cooking compartment and said heating compartment, said one or more vent openings are positioned between said cooking member and said at least two sides of said cooking compartment.

18. The kitchen oven of claim 10 wherein said cooking member within said bottom cover extends from said cooking compartment to said heating compartment.

19. A general purpose kitchen oven appliance comprising:
a cooking compartment having a substantially planar oven bottom, two oven sides, an oven back, a substantially planar oven top, and a front door hingedly connected for opening to allow frontal access to said cooking compartment;
a heat source positioned beneath said oven bottom;
wherein said oven bottom further comprises a carrier and a cooking member removable from a remaining portion of said oven bottom, wherein said cooking member includes a cooking surface integrally formed in said cooking member for directly contacting an item to be baked in said cooking compartment; and
said cooking surface is made of one or more materials, wherein said one or more materials is at least one of clay, stone, cast iron, and steel.

20. The general purpose kitchen oven appliance of claim 19 wherein said cooking surface of said cooking member is substantially planar with, raised, or depressed within said carrier of said oven bottom.

21. The general purpose kitchen oven appliance of claim 20 wherein said carrier of said oven bottom is stamped metal about said cooking surface of said cooking member.

22. The general purpose kitchen oven appliance of claim 19 wherein said one or more materials is at least one of clay and stone.

23. The general purpose kitchen oven appliance of claim 22 wherein a portion of said cooking surface is unglazed.

24. The general purpose kitchen oven appliance of claim 19 wherein said cooking surface of said cooking member is substantially planar with said carrier and said remaining portion of said oven bottom.

* * * * *